United States Patent
Belloso

(12) 
(10) Patent No.: US 7,647,994 B1
(45) Date of Patent: Jan. 19, 2010

(54) HYBRID VEHICLE HAVING AN ELECTRIC GENERATOR ENGINE AND AN AUXILIARY ACCELERATOR ENGINE

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 559 days.

(21) Appl. No.: 11/545,111

(22) Filed: Oct. 10, 2006

(51) Int. Cl.
*B60K 1/00* (2006.01)
*B60K 6/46* (2006.01)
*B60K 5/08* (2006.01)
*B60W 10/06* (2006.01)
*B60W 10/08* (2006.01)

(52) U.S. Cl. .............. 180/65.31; 180/65.25; 180/65.28; 180/65.285; 180/69.6

(58) Field of Classification Search .............. 180/65.21, 180/65.22, 65.225, 65.23, 65.245, 65.25, 180/65.26, 65.265, 65.28, 65.285, 65.6, 298, 180/69.6
See application file for complete search history.

(56) References Cited

U.S. PATENT DOCUMENTS

| | | | |
|---|---|---|---|
| 2,132,450 A * | 10/1938 | Wolf .......................... 180/69.6 |
| 4,099,589 A * | 7/1978 | Williams ............... 180/65.245 |
| 5,343,971 A | 9/1994 | Heidelberg et al. |
| 5,513,719 A | 5/1996 | Moroto et al. |
| 5,788,003 A | 8/1998 | Spiers |
| 6,044,922 A | 4/2000 | Field |
| 6,179,078 B1 | 1/2001 | Belloso |
| 6,209,672 B1 | 4/2001 | Severinsky |
| 6,328,671 B1 | 12/2001 | Nakajima et al. |
| 6,668,954 B2 | 12/2003 | Field |
| 6,691,806 B2 * | 2/2004 | Wolfgang et al. ............ 180/6.7 |
| 6,708,789 B1 | 3/2004 | Albuquerque De Souza E Silva |
| 6,712,165 B1 | 3/2004 | Okazaki |
| 6,717,281 B1 | 4/2004 | Brandon et al. |
| 6,856,035 B2 | 2/2005 | Brandon et al. |
| 6,958,549 B2 | 10/2005 | Wakitani et al. |
| 6,959,237 B2 | 10/2005 | Ehrhart et al. |
| 6,962,224 B2 | 11/2005 | Nakanowatari |
| 6,965,173 B2 | 11/2005 | Fukasaku et al. |
| 6,995,480 B2 | 2/2006 | Amano et al. |
| 7,004,273 B1 | 2/2006 | Gruenwald et al. |
| 7,028,796 B2 | 4/2006 | Kim |
| 7,044,255 B2 | 5/2006 | Maeda et al. |
| 7,152,705 B2 * | 12/2006 | Alster et al. ........... 180/65.245 |
| 7,317,259 B2 * | 1/2008 | Yamauchi ................. 290/40 C |
| 2003/0037978 A1* | 2/2003 | Hofbauer .................... 180/65.4 |
| 2003/0178953 A1* | 9/2003 | Tumback et al. ............... 318/8 |
| 2008/0015760 A1* | 1/2008 | Yamauchi .................... 701/67 |

* cited by examiner

*Primary Examiner*—Paul N Dickson
*Assistant Examiner*—John R Olszewski
(74) *Attorney, Agent, or Firm*—Norman B. Rainer

(57) ABSTRACT

A drive-train for a fuel-efficient wheeled vehicle includes a first internal combustion engine and a second internal combustion engine of lesser power adapted to drive a generator. An electric motor is adapted to drive the vehicle primarily during cruising mode operation. The first engine is employed primarily to provide maximal power to the vehicle for acceleration, hill-climbing and towing. The power from both the motor and first engine can be selectively combined for varied conditions of operation of the vehicle.

13 Claims, 8 Drawing Sheets

HYBRID VEHICLE HAVING AN ELECTRIC GENERATOR ENGINE AND AN AUXILIARY ACCELERATOR ENGINE

BACKGROUND OF THE INVENTION

1. Field of the Invention

This invention concerns fuel-efficient vehicles, and more particularly relates to automotive vehicles powered by both an electric motor and an internal combustion engine, popularly known as "hybrid" vehicles.

2. Description of the Prior Art

Hybrid vehicles have been developed to improve the fuel efficiency of motor vehicles. They are powered by both an internal combustion engine and an electric motor energized by rechargeable storage batteries. The combined power of both power sources is used when maximal power is needed, such as for acceleration, towing heavy loads or climbing steep grades. The engine is generally used for cruising, and is usually severely down-sized to achieve fuel efficiency. The electric motor can be used alone but only for relatively short distances because of the limited power capacity of the batteries which soon become discharged and lose their power. Consequently, the electric motor is usually simply used to augment the power of the engine for some fairly short duty cycles such as to quickly accelerate the vehicle from a standing start and for passing. Performance can deteriorate for longer heavy duty cycles such as when climbing long grades or towing heavy loads when the down-sized engine may have to toil alone without assistance from the electric motor after the batteries become discharged.

Some hybrid vehicles have been modified to increase the cruising range of the electric motor by adding substantial numbers of storage batteries to the vehicle, and then by charging these batteries overnight using household electricity. Although such vehicles can travel as much as 60 miles between charges, and with little use of gasoline, the cost of the extra batteries is considerable. The batteries also have limited life expectancy, and the added weight of the batteries adversely affects the vehicle's fuel efficiency.

Examples of hybrid vehicles involving an internal combustion engine and one electric motor are found in the following U.S. Pat. Nos.

| |
|---|
| 5,513,719 |
| 5,788,003 |
| 6,044,922 |
| 6,209,672 |
| 6,328,671 |
| 6,668,954 |
| 6,706,789 |
| 6,712,165 |
| 6,958,549 |
| 6,995,480 |
| 7,004,273 |
| 7,028,796 |

Hybrid vehicles involving a single internal combustion engine in exemplified or suggested association with two or more electric motors are disclosed in the following U.S. Pat. Nos.

| |
|---|
| 5,343,971 |
| 6,717,281 |
| 6,856,035 |
| 6,959,237 |
| 6,962,224 |
| 6,965,173 |
| 7,044,255 |

Hybrid vehicles have high initial and maintenance costs due to the need for an especially down-sized engine, batteries of high amperage capacity, and the associated specialized control components. These requirements make it difficult to apply current hybrid technology as after-market modifications for converting current standard automotive vehicles into fuel-efficient hybrid vehicles.

The present invention provides cost-effective solutions to the problems cited above.

Firstly, it enables the vehicle to cruise for long distances powered by an electric motor without the need for a substantially increased number of high-capacity batteries. Instead, the electric motor is energized by an on-board generator powered by a fuel-efficient internal combustion engine. This permits the vehicle to cruise over long distances with maximal fuel-efficiency using mainly the power from its electric motor. The weight of the added equipment need not significantly affect the fuel economy of the vehicle, and the cost should compare favorably with that of current hybrid vehicles.

Secondly, this invention achieves the desired fuel economy for long distance cruising without sacrificing the vehicle's performance, particularly in acceleration, load-bearing, towing and hill-climbing. This is done through the use of a separate auxiliary "accelerator" engine to add to the power of the electric motor whenever more power is needed. Since the accelerator engine is usually operated only for short periods of time, and is usually not operated while the vehicle is traveling over long distances at cruising speed, its size, power and fuel consumption need not substantially impact the overall fuel efficiency of the vehicle. Hence, the operator can enjoy the comfort and confidence of having as much power as he desires under the hood and yet, with properly prudent driving technique, cruise with high fuel-efficiency over long distances.

This invention further permits great versatility in the choice of both the generator engine and accelerator engine. For example, the generator engine can be a small diesel engine, powerful enough to keep the batteries fully charged, and the accelerator engine can be a powerful gasoline engine, such as a Wankel rotary engine, for quick throttle response and lively performance.

The power train aspect of the present invention is easily adaptable for use as an add-on after-market modification of some existing motor vehicles which are thereby converted into fuel-efficient hybrid vehicles in a cost-effective manner.

It is accordingly a primary object of this invention to provide a hybrid vehicle capable of cruising for long distances using power from an electric motor without the need for high storage battery capacity.

It is an additional object of the present invention to provide a hybrid vehicle capable of cruising for long distances with maximal fuel-efficiency, without sacrifice of acceleration, hill climbing, and load-carrying capabilities.

It is another object of this invention to provide a fuel-efficient hybrid power train which can be installed into an existing automotive vehicle as an after-market add-on modification requiring minimal changes in said vehicle.

In one aspect of the present invention, a conventional non-hybrid vehicle having a regular engine with a horsepower in the range of about 100 to 350, a 12 volt battery, and a generator that is belt-driven by the vehicle's drive shaft is converted into a hybrid vehicle by the introduction of the following features:

a) an electrically actuated motor of about 50 to 120 horsepower which serves as the main source of power to maintain the vehicle at cruising speed for long distance travel, b) a relatively small, fuel-efficient second internal combustion engine of about 50 to 120 horsepower henceforth referred to as a "generator" engine that drives said generator, and c) control means causing said regular engine, henceforth referred to as the first or "accelerator" engine, to operate only when the vehicle requires additional power, as for acceleration, hill climbing, and carrying heavy loads.

In effect, such converted hybrid vehicle utilizes said motor as its primary source of power for cruising travel, and employs the accelerator engine simply as an auxiliary engine to be used only when additional power is needed. The ratio of the horsepower of the accelerator engine to the horsepower of the generator engine is preferably in the range of 1.5:1 to 3:1.

For ease of operation, the generator engine can be programmed to run automatically whenever the battery needs to be charged and to stop automatically when the battery is fully charged. For added fuel-efficiency, the electric motor can be configured as a motor/generator to charge the battery through regenerative braking, a technology which is well known in the art. For further ease of operation, the accelerator engine can be caused to start automatically whenever the gas pedal is depressed beyond what is needed to run the electric motor at full power, and to be automatically coupled to the output shaft of the electric motor, when its power is needed, through a suitable automatic clutch mechanism such as an overriding sprag clutch. Further savings in fuel consumption can be achieved if the accelerator engine is configured to be automatically shut down, namely deprived of fuel whenever the vehicle is being maintained at cruising speed by the electric motor alone. This may be controlled by the degree to which the gas pedal is depressed. Alternatively, start-up, shut down, engagement and disengagement of the accelerator engine may be controlled through the vehicle cruise control system in response to input signals from speed sensors and/or load sensors associated with the driving wheels.

In a further aspect of the present invention, a hybrid automotive vehicle is provided having a power train comprised of:
1) a first internal combustion "accelerator" engine,
2) speed change transmission means having an input shaft which receives power from said first engine,
3) an electric motor having sufficient power to maintain said vehicle at an acceptable cruising speed and delivering said power in a manner to controllably receive additional power from said first engine, and
4) an electrical supply system comprised of a) a second internal combustion "generator" engine of lesser power than said first engine, b) an electrical generator driven by said second engine, and c) a rechargeable storage battery interactive between said generator and motor.

In preferred embodiments, releasable coupling means are interactive between said accelerator engine and transmission means, enabling controlled automatic transfer of power to said transmission means. Suitable coupling means include free wheeling devices such as an overriding sprag clutch.

Said conveyance of power serves to accelerate said vehicle from a standing start to cruising speed by the combined power of said electric motor and said accelerator engine, and then, when the operator partially releases the gas pedal to stop the acceleration and to simply maintain the vehicle at cruising speed by using power from the electric motor alone, the fuel supply to said accelerator engine is diminished then stopped, causing said accelerator engine to slow down and stop, and as said accelerator engine slows down below the speed of said electric motor, said engine is automatically decoupled from said transmission input shaft through the function of said sprag clutch. Then, if or when the operator depresses the gas pedal again to provide more power than that produced by said electric motor, said accelerator engine is automatically restarted and speeded up to match the speed of said electric motor, causing said accelerator engine to be automatically coupled to said transmission input shaft through the action of said sprag clutch.

The aforesaid hybrid vehicle of this invention achieves four desirable results, namely:

a) It enables said electric motor, powered by said electric generator assembly, to maintain the vehicle at cruising speed with reduced fuel consumption per unit of distance traveled.

b) It enables the vehicle to accelerate quickly to cruising speed through the combined power of the electric motor and the accelerator engine.

c) It enables the power train, including said accelerator engine, to remain ready to be activated whenever increased power is needed. and d) It enables the operator to selectively control the operation of said motor and said accelerator engine, including the automatic engagement and disengagement of said accelerator engine by simply depressing or releasing the gas pedal in the same manner as would have been required if he were operating a standard non-hybrid motor vehicle.

Said releasable coupling means may be a friction clutch such as the type used with standard manual transmissions, a fluid torque converter of the type generally used with automatic transmissions, a centrifugal clutch, electromagnetic clutch, or other suitable types of releasable coupling means.

In an alternative embodiment, the accelerator engine is coupled to the speed change transmission in the conventional manner (i.e., via a friction dry plate clutch in the case of a manual transmission, or via a fluid torque converter in the case of an automatic transmission) and the vehicle is accelerated from a standing start to cruising speed by power from the accelerator engine alone. After the vehicle reaches cruising speed, the speed change transmission is shifted to neutral and the vehicle is placed in a free-wheeling state.

The electric motor may be coupled to a pinion drive of a differential, completely bypassing the speed change transmission, using a power transfer means which may be an endless chain connected to sprockets, or spur gears, or combinations thereof. For added speed flexibility, a continuously variable torque converter may be installed between the electric motor output shaft and said power transfer means.

BRIEF DESCRIPTION OF THE DRAWING

With these and other advantages in view, the invention is disclosed in the following description which will be more fully understood when read in conjunction with the following drawings in which.

For clarity of illustration, details which are not relevant to the invention, such as engine mounts, electrical circuits, transmission mounts, internal parts of the speed change transmission, differential, transaxle, sprag clutch and continuously variable torque converter, etc., have been omitted from the aforesaid drawings.

DESCRIPTION OF THE PREFERRED EMBODIMENT

Figure 1:
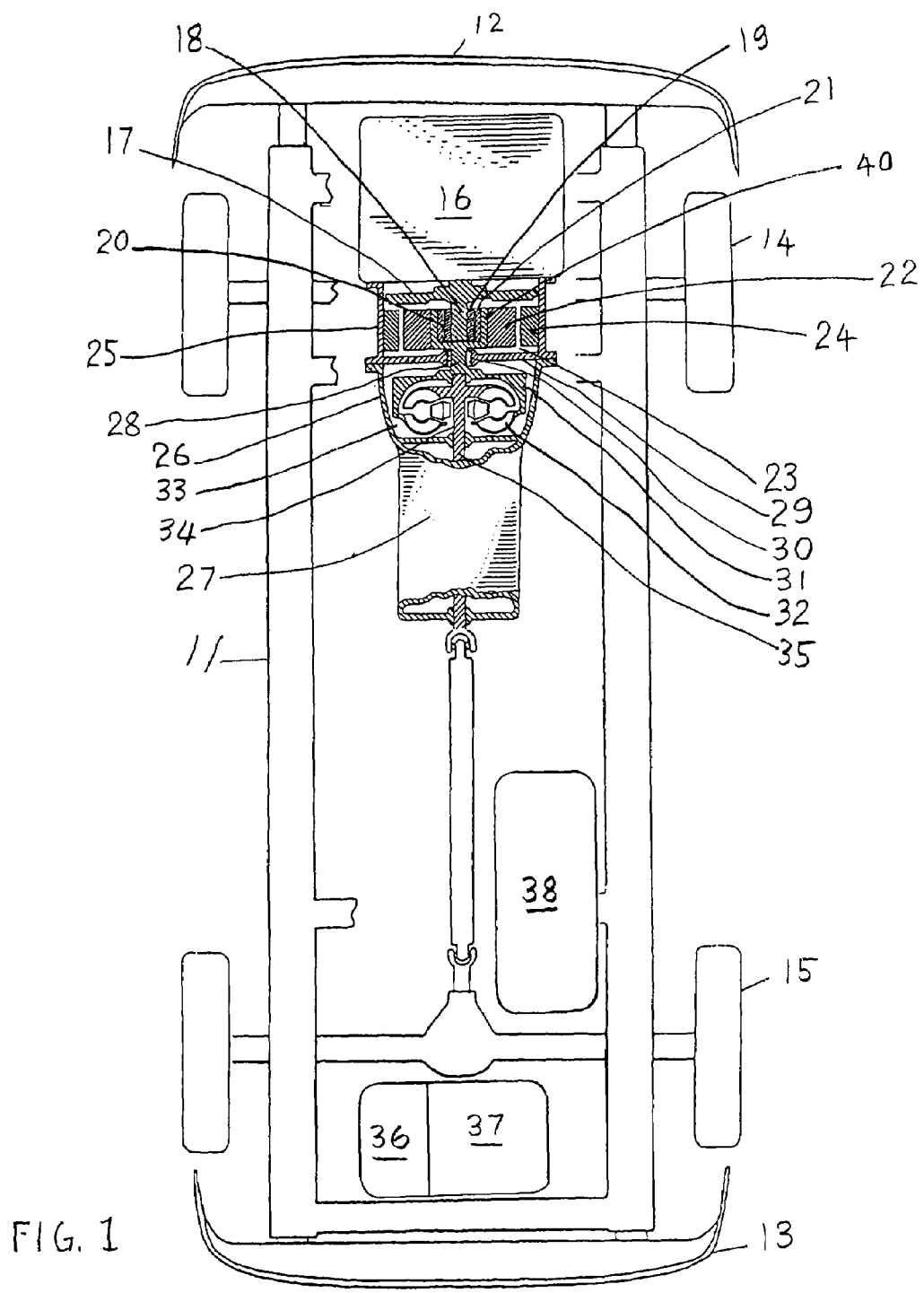
FIG. 1 is a schematic top view, partly in section, of an embodiment of the hybrid vehicle of this invention equipped with an automatic transmission.
Figure 2:
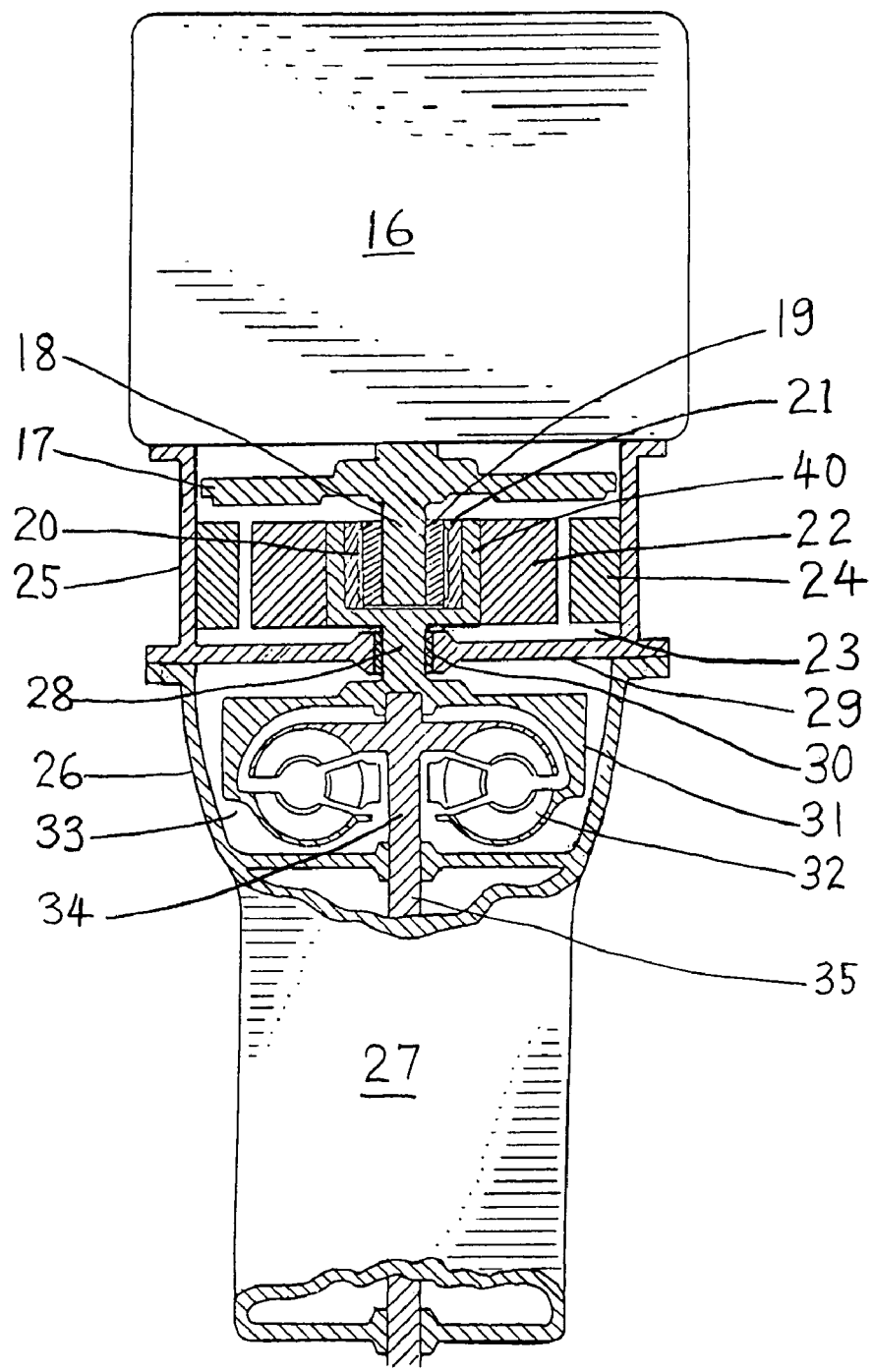
FIG. 2 is a magnified fragmentary view of a portion of FIG. 1.

Referring now to the above drawings wherein one character designates one part of the vehicle, FIG. 1 shows the vehicular chassis 11 connected to the front bumper 12 and rear bumper 13, and supported by front wheels 14 and rear wheels 15.

Accelerator engine 16, mounted on chassis 11, has flywheel 17 and output shaft 18 interactive with releasable coupling means in the form of sprag clutch 20, whose inner race 19 is fixedly mounted upon output shaft 18. Outer race 21 of sprag clutch 20 is fixedly mounted within the hub 40 of the armature 22 of electric motor 23 so that armature 22 is freely rotatable on output shaft 18 in one direction, particularly when armature 22 is spinning faster than output shaft 18, but would be fixedly locked to output shaft 18 if shaft 18 were to tend to spin faster than armature 22. Field coils 24 of electric motor 23 are mounted on bell housing extension 25 which is fixedly bolted to accelerator engine 16, and upon which bell housing 26 of automatic transmission 27 is in turn fixedly bolted.

Armature 22 is connected to electric motor output shaft 28 which extends through rear wall 29 of bell housing extension 25 and is supported by bearings 30 mounted on rear wall 29. Electric motor output shaft 28 terminates in a motor flywheel 31 which supports the driving vanes 32 of fluid torque converter 33 whose output shaft 34 extends rearward to become the input shaft 35 of automatic transmission 27.

Electric motor 23 is energized by electricity generated by generator 36 from power produced by generator engine 37, and supplemented by electricity stored in battery 38.

To start the vehicle, the operator depresses the accelerator (or "gas") pedal which activates a rheostat that controls how much electricity will be allowed to flow from battery 38 and generator 36 to electric motor 23 which then begins to spin armature 22, output shaft 28 and driving vanes 32 of fluid torque converter 33. Generator engine 37 may be configured to start running as soon as a substantial amount of current begins to flow from battery 38 to motor 23 or it may be programmed to automatically start as soon as the battery 38 is discharged to a predetermined degree. When the gas pedal is depressed far enough for full power to be produced by electric motor 23, the gas pedal also closes a start switch for the accelerator engine 16, turns on the ignition and begins to open the gas supply so that accelerator engine 16 starts running, initially at "idle" speed. The transmission 27 may then be shifted to "drive" or "reverse." When the gas pedal is depressed further the accelerator engine 16 will run faster and eventually match the rotational speed of electric motor 23. At this point the inner race 19 and other race 21 of sprag clutch 20 will automatically lock together and couple output shaft 18 to armature 22 so that combined power from both the accelerator engine 16 and electric motor 23 will be transmitted to fluid torque converter 33 thence to automatic transmission 27, and thence to differential 34 and rear wheels 15.

When the vehicle has reached the desired speed, the operator simply eases up on the gas pedal until the accelerator engine 16 slows down and stops, and then maintains slight pressure on the gas pedal to regulate power from the electric motor 23 to maintain the cruising speed of the vehicle. When more power is needed to accelerate or climb a grade the operator needs only to depress the gas pedal to generate more power from electric motor 23, and if necessary depress it further to restart and run accelerator engine 16 to supply added power. These are exactly the same maneuvers that the operator would have had to do were he driving a currently standard vehicle similarly equipped with an automatic transmission.

Figure 3:
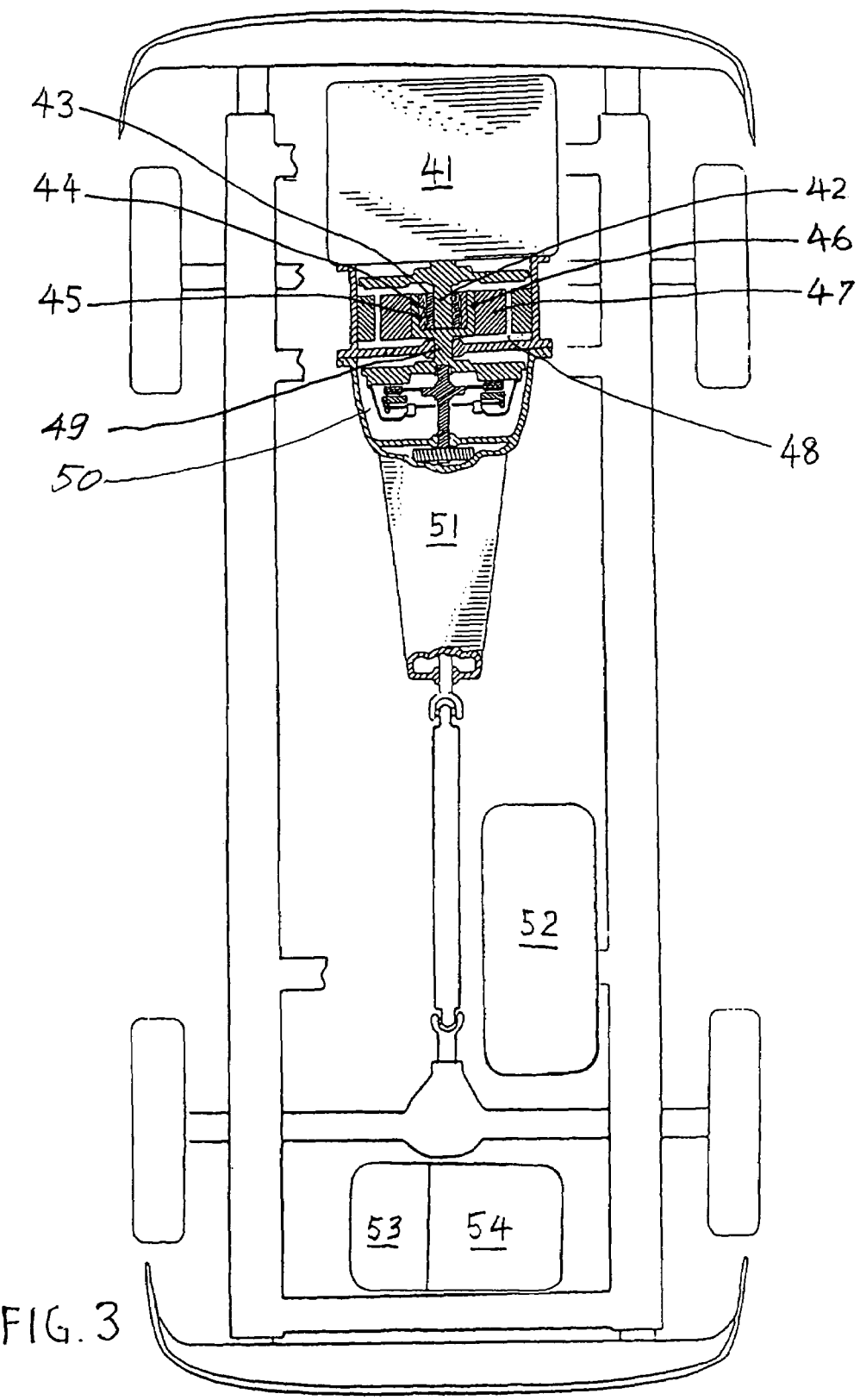
FIG. 3 is a schematic top view, partly in section, of a first alternative embodiment of this invention equipped with a manual transmission.
Figure 4:
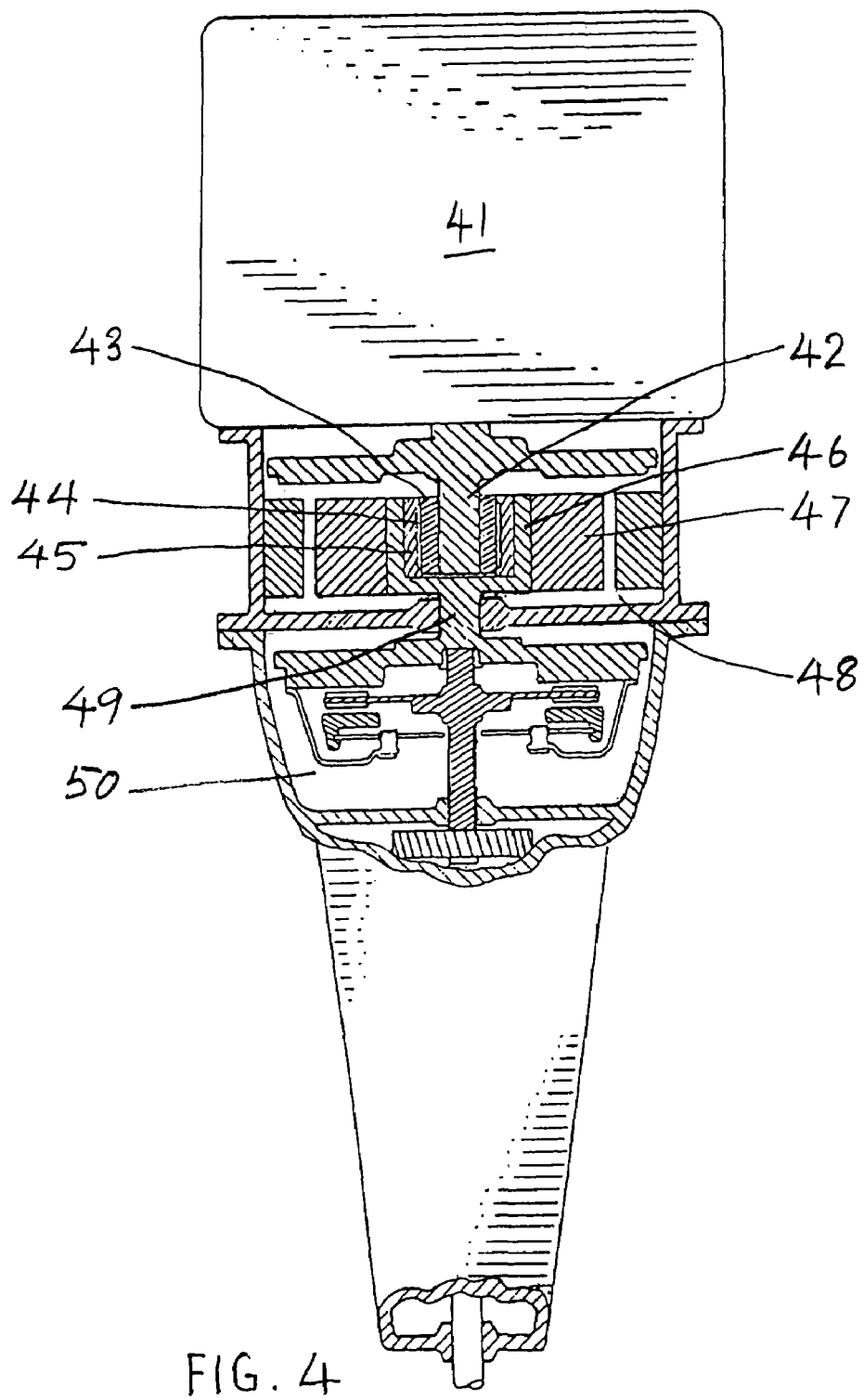
FIG. 4 is a magnified fragmentary view of a portion of FIG. 3.

Turning now to FIG. 3, there is shown the first alternative embodiment of the invention applied to a front-engine/rear-wheel drive vehicle with manual transmission. Accelerator engine 41 has an output shaft 42 upon which is fixedly mounted the inner race 43 of sprag clutch 44. The outer race 45 of sprag clutch 44 is fixedly mounted on the hub 46 of the armature 47 of electric motor 48. When both accelerator engine 41 and electric motor 48 are in operation, they rotate coaxially in the same direction. Sprag clutch 44 permits electric motor 48 to rotate freely in its operational direction relative to output shaft 42, but not in reverse, so that if said output shaft 42 were to tend to rotate faster than electric motor 48, sprag clutch 44 will lock the two together, causing them to turn at the same speed and transmit their combined power through electric motor output shaft 49 to friction clutch 50 which is a standard dry plate clutch operated through a clutch foot pedal.

To operate the vehicle, the accelerator engine is started and run initially at idle speed, causing the sprag clutch to engage so that both engine 41 and electric motor 48 are running at the same speed. The clutch is depressed, the transmission is shifted to first gear, and the accelerator pedal is depressed to feed current to electric motor 48 and, if depressed further, to feed fuel to engine 41, whereupon the clutch pedal is gradually released to engage the clutch 50 and move the vehicle on the combined power of accelerator engine 41 and electric motor 48. The transmission 51 is shifted through the gears in the usual manner, and when cruising speed is reached the operator eases on the accelerator pedal to cause accelerator engine 41 to slow down to idle speed and yet allow electric motor 48 to produce enough power to maintain the vehicle at cruising speed. The accelerator pedal is calibrated in such a way that when it is depressed one-third of the way down only a rheostat which controls power from the electric motor 48 is operated, and then when the pedal is depressed further, increasing amounts of fuel are fed to accelerator engine 41. When the accelerator engine slows below the speed of electric motor 48, the sprag clutch 44 automatically disengages the output shaft 42 of engine 41 from the hub 46 of electric motor 48, thereby disengaging accelerator engine 41 from transmission 51. The vehicle then cruises solely on power from electric motor 48 which draws current from battery 52 which is kept fully charged by generator 53 powered by generator engine 54.

Figure 5:
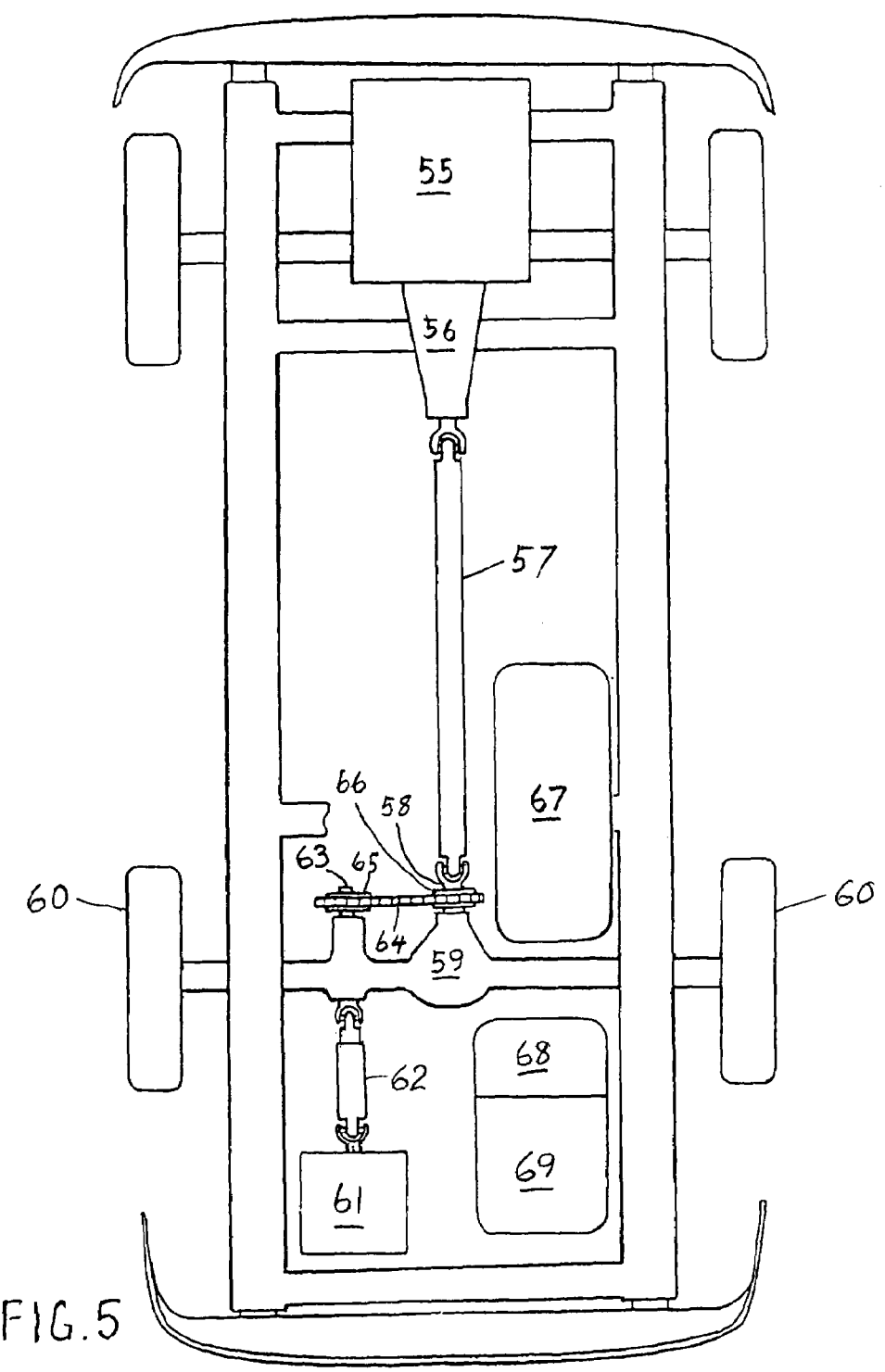
FIG. 5 is a schematic top view of a second alternative embodiment of this invention.

FIG. 5 illustrates a second alternative embodiment adapted to be more easily retro-fitted to a standard front-engine/rear wheel drive vehicle. Accelerator engine 55 is the stock regular engine of the vehicle, mated to a standard transmission 56 which may be manual or automatic, transmitting power through propeller shaft 57, pinion 58 and differential 59 to drive (rear) wheels 60. Electric motor 61 supplies power through splined short propeller shaft 62, jack shaft 63, drive chain 64, sprockets 65 and 66, and thence to pinion 58. Generator engine 69 powers generator 68 which keeps battery 67 fully charged, and also supplies additional power to electric motor 61 as needed.

The vehicle is accelerated from a standing start to cruising speed by power from the accelerator engine in the usual manner. The transmission is then shifted to neutral and the vehicle is placed in a free wheeling state. Electric motor 61 is then speeded up to provide power for cruising. Meanwhile accelerator engine 55 is on standby to produce additional power as needed. As explained above, this vehicle can travel at cruising speed with less fuel consumption per distance traveled by using the electric motor/electric generator system as compared to traveling long distances on the larger regular (accelerator) engine which consumes more fuel to travel the same distance.

Figure 6:
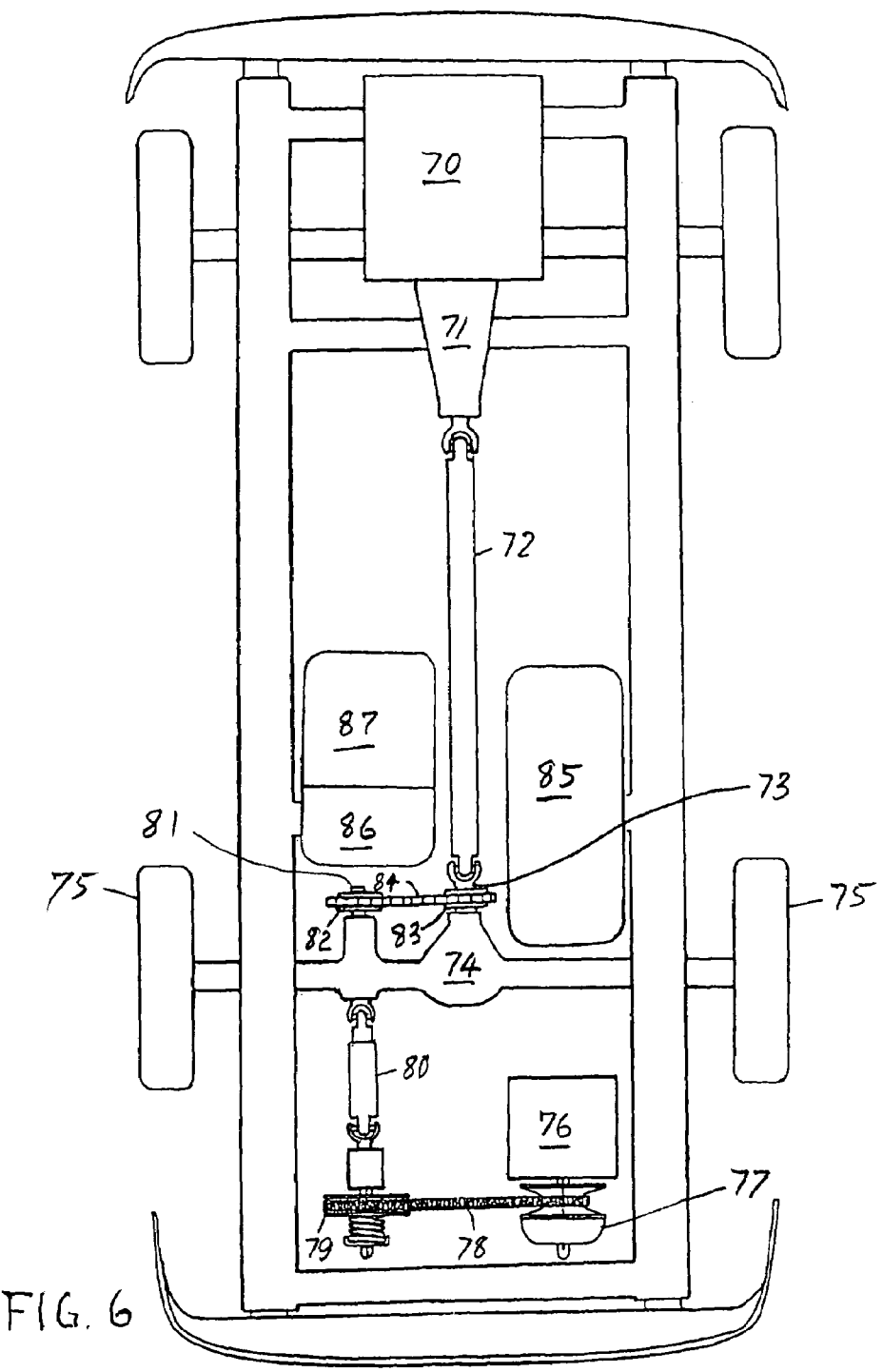
FIG. 6 is a schematic top view of a third alternative embodiment of this invention.

FIG. 6 illustrates a third alternative embodiment of the invention adapted to be easily retro-fitted to a front engine/rear wheel drive vehicle modified to give the electric motor more flexibility of operation at a wider range of speeds and having more torque flexibility as well. Accelerator engine 70 is the regular engine of the vehicle, mated to a standard transmission 71 which may be an automatic transmission or a manual transmission connected to propeller shaft 72, pinion 73, differential 74 and wheels 75. The vehicle is accelerated to cruising speed with power from accelerator engine 70 through speed change transmission 71 in the usual manner. When cruising speed is reached, transmission 71 is shifted to neutral, placing the vehicle in a free wheeling state, and fuel flow to engine 70 is cut off. Electric motor 76 is speeded up to deliver power through drive pulley 77, drive belt 78 and driven pulley 79 of a movable sheave continuously variable ratio torque converter, thence through splined short propeller shaft 80, jack shaft 81, sprockets 82 and 83 and endless chain 84, thence to pinion 73 to maintain the vehicle at cruising speed. Battery 85 supplies power to electric motor 76. Generator 86, powered by generator engine 87, supplies electricity to battery 85 to keep it fully charged at all times.

Figure 7:
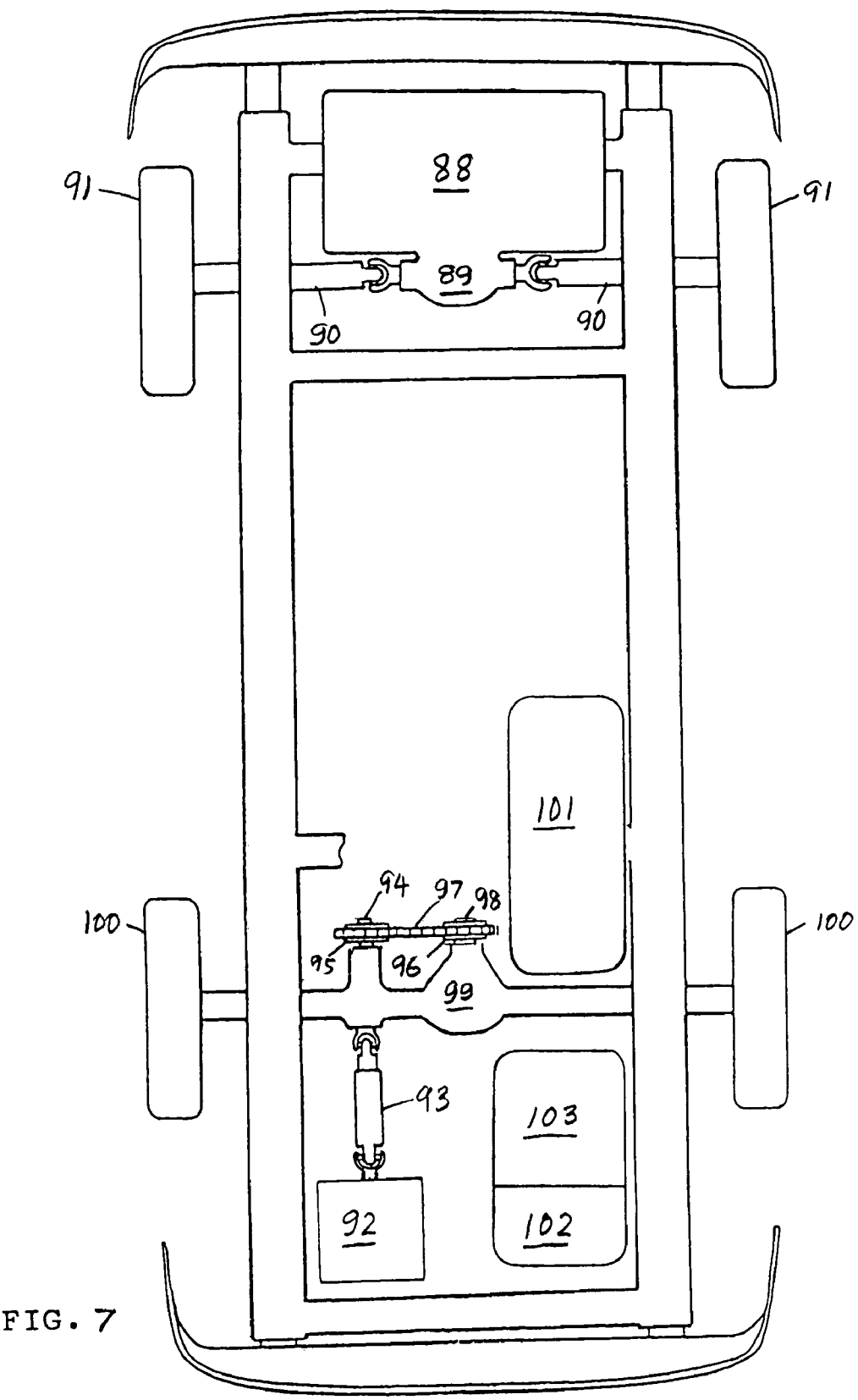
FIG. 7 is a schematic top view of a fourth alternative embodiment of this invention.

FIG. 7 shows how the invention may be fitted or retro-fitted to a front engine/front wheel drive vehicle. Accelerator engine 88 is a regular engine mated to a transaxle 89 which drives half-shafts 90 and front driving wheels 91. The vehicle is accelerated to cruising speed by power from engine 88, coursed through transaxle 89 and wheels 91. After cruising speed is reached, the transaxle is shifted to neutral, placing the vehicle in a free wheeling state. Electric motor 92 is then speeded up to transmit power through splined short propeller shaft 93 to jack shaft 94, sprockets 95 and 96 and endless chain 97, thence to pinion 98, differential 99 and wheels 100, to maintain the vehicle at cruising speed for economical long distance travel. Battery 101 supplies power to electric motor 92. Electric generator 102, powered by generator engine 103 supplies electric current to battery 101 to keep it fully charged at all times, and to supply additional current to electric motor 92 whenever necessary.

Figure 8:
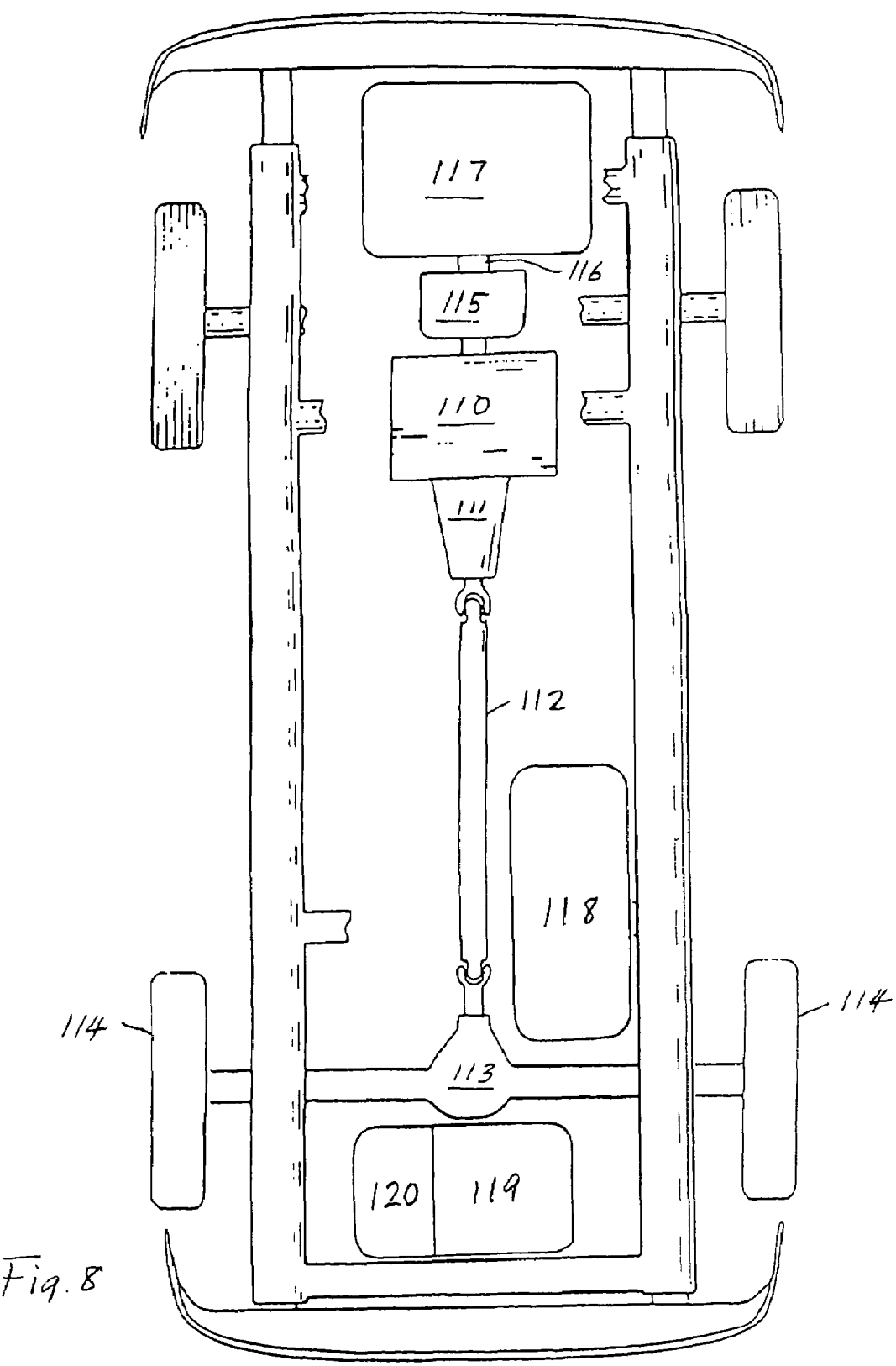
FIG. 8 is a schematic top view of a fifth alternative embodiment of this invention.

FIG. 8 illustrates a fifth alternative embodiment of the invention which uses an electromagnetic power clutch 115 or any similarly suitable clutch means, instead of a sprag clutch. Electric motor 110 is coupled to speed change transmission 111 which is connected to propeller shaft 112, thence to differential 113 and drive wheels 114 in the usual manner. Electromagnetic power clutch 115 is fixedly mounted on the output shaft 116 of accelerator engine 117. The output shaft of electromagnetic power clutch 115 is coupled to the main shaft of the rotor of electric motor 110, which is in turn coupled to said speed change transmission 111. Accelerator engine 117 can therefore be selectively coupled to speed change transmission 111 via electromagnetic clutch 115 and the main shaft of electric motor 110.

To accelerate the vehicle, power from both the accelerator engine 117 and electric motor 110 are used. To cruise economically, accelerator engine 117 is decoupled through electromagnetic clutch 115 and stopped and the vehicle is kept at its cruising speed by power from electric motor 110 alone. Electric generator engine 119 drives electric generator 120 which supplies current to electric motor 110 and also charges battery 118. Electric motor 110 can be configured to be a motor/generator so that it can charge battery 118 through regenerative braking. Battery 118 need not be of high capacity since electric motor 110 can be powered continuously for long distance cruising operation by generator 120. Battery 118 is only useful to supply supplemental current to electric motor 110 and to supply current to accessory electrical devices in the vehicle, such as the radio, gauges and lights.

Other types of releasable couplings can be used instead of electromagnetic power clutch 115, and may be selected from a group which includes centrifugal clutches, single disc or multiple disc clutches, cone clutches, toroidal torque converters, pawl and ratchet freewheeling clutches, sprag clutches or any combination thereof.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A fuel efficient hybrid power train for a wheeled vehicle having a rechargeable storage battery and transmission means for controllably supplying power to said wheels, said power train comprising:
   a) a first internal combustion engine capable of producing sufficient power to satisfy all the operational needs of the vehicle,
   b) a second internal combustion engine of lesser power capability than said first engine,
   c) a generator which is activated by said second engine to produce electrical energy that is routed in part to said storage battery,
   d) an electric motor, actuated by electric energy from said battery and generator to produce power that is mechanically conveyed to wheels that drive the vehicle,
   e) control means which activates said first engine when the vehicle requires maximal power and otherwise deactivates said first engine, thereby enabling said electric motor to provide the sole propulsive needs of the vehicle in a cruising mode of operation, and
   f) releasable coupling means which enable power from said first engine to be adjustably added to the power produced by said electric motor when the vehicle is in an accelerating mode of operation or is otherwise in need of additional power.

2. The power train of claim 1 wherein said first and second engines are gasoline-operated.

3. The power train of claim 2 wherein the ratio of the power of said first engine to the power of said second engine is between 1.5:1 and 3:1.

4. The power train of claim 2 wherein said first engine is deactivated by way of stopping the flow of gasoline thereto.

5. The power train of claim 3 wherein said first engine has an output shaft.

6. The power train of claim 5 wherein said releasable coupling means is interactive between said output shaft and said electric motor.

7. The power train of claim 6 wherein said releasable coupling means is a sprag clutch.

8. The power train of claim 7 wherein said electric motor has an output shaft that interacts with said transmission means.

9. The power train of claim 5 wherein said control means includes a standard foot-operated accelerator pedal whereby initial depression of said pedal activates said motor and increases its rotational speed, and further depression activates said first engine to add its power to the power of said motor.

10. The power train of claim 9 wherein addition of the power of said first engine to the power of said motor is achieved by said coupling means when the rotational speed of said output shaft exceeds the rotational speed of said motor.

11. The power train of claim 1 wherein said vehicle has paired rear wheels which function as the drive wheels for the vehicle, and a differential interactive between said rear wheels, and the power from said motor is conveyed to said differential in a manner that bypasses said transmission means.

12. The power train of claim 8 wherein the output shafts of said first engine and said motor are in axial alignment.

13. The power train of claim 12 wherein the output shafts of said first engine and said motor rotate in the same direction.

\* \* \* \* \*